May 10, 1938.   L. WICKENDEN   2,116,920
CONCENTRATION OF LIQUID FOOD MATERIAL
Filed Jan. 11, 1934   2 Sheets-Sheet 1
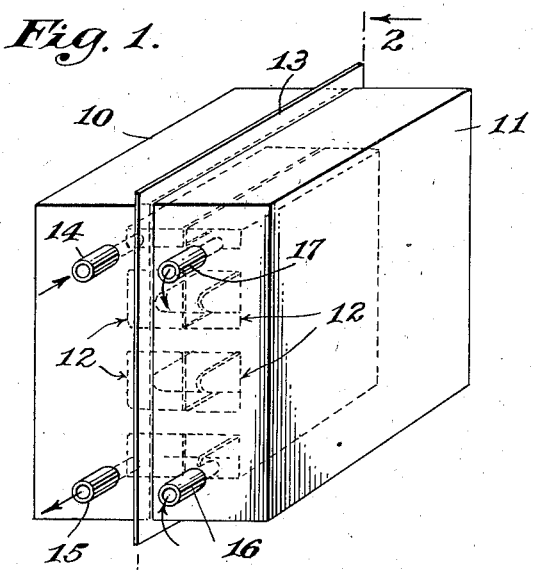
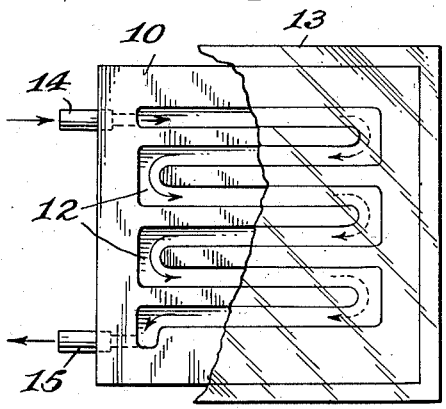
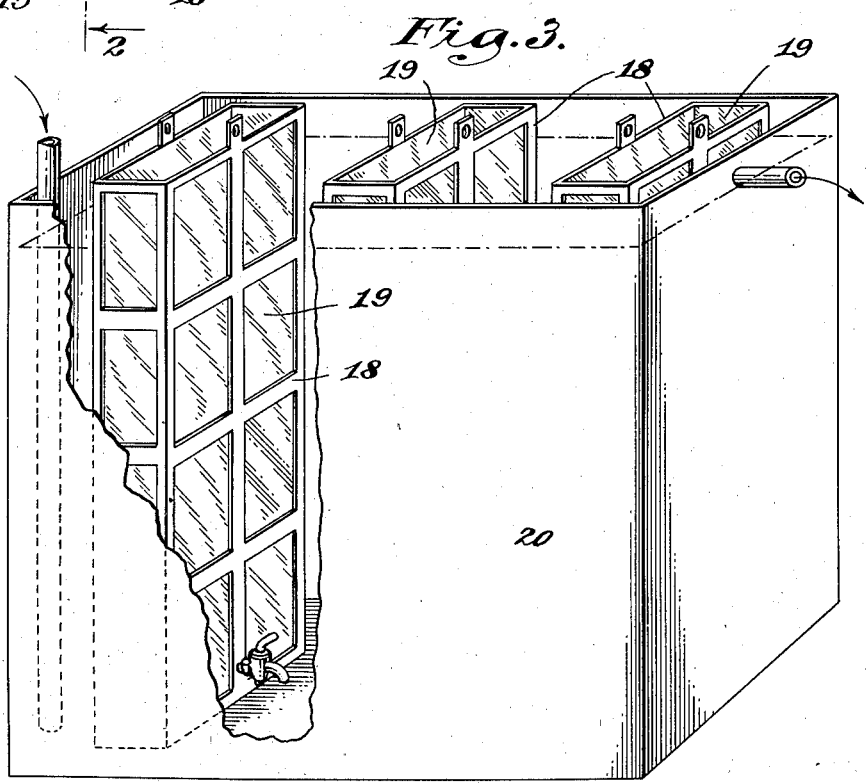
INVENTOR:
Leonard Wickenden
BY
Ramsey & Kent
ATTORNEYS May 10, 1938.  L. WICKENDEN  2,116,920
CONCENTRATION OF LIQUID FOOD MATERIAL
Filed Jan. 11, 1934  2 Sheets-Sheet 2

INVENTOR:
Leonard Wickenden
BY
Ramsey & Kent
ATTORNEYS

Patented May 10, 1938

2,116,920

UNITED STATES PATENT OFFICE 2,116,920

CONCENTRATION OF LIQUID FOOD MATERIAL

Leonard Wickenden, Manhasset, N. Y., assignor to Beau May Process Corporation, New York, N. Y., a corporation of New York Application January 11, 1934, Serial No. 706,203

2 Claims. (Cl. 99—105)

This invention provides a method for the concentration of aqueous solution or suspensions by means of osmosis.

The process is adapted more particularly to the concentration of liquid food materials containing a high percentage of water, such as fruit juices, milk, extract of coffee, et cetera.

A primary object of the invention is to concentrate such liquids without altering their original flavor.

Methods of concentration now commonly used such as boiling, have very detrimental effects on the volatile constituents which give food products their distinctive flavors, and the present invention provides for concentration without the necessity of any detrimental change of temperature.

Some methods of concentration have been proposed that are based on evaporation without substantial increase of temperature but in these methods there is a change of flavor caused either by bubbles which rise through the liquid or by oxidation through contact with the air. Both of these detrimental effects are avoided by the method of this invention.

The process can be carried out either as a continuous process or as a batch process depending upon the economics of any particular situation.

While preferred forms of the invention have been disclosed herein for purposes of illustration, it should be understood that various changes can be made without departing from the spirit of the invention.

In the drawings

Fig. 1 is a perspective view of a unit adapted for carrying out the process as a continuous process.

Fig. 2 is a section on line 2—2 of Fig. 1.

Fig. 3 is a perspective view of one apparatus for carrying out the invention as a batch process.

Figure 4:
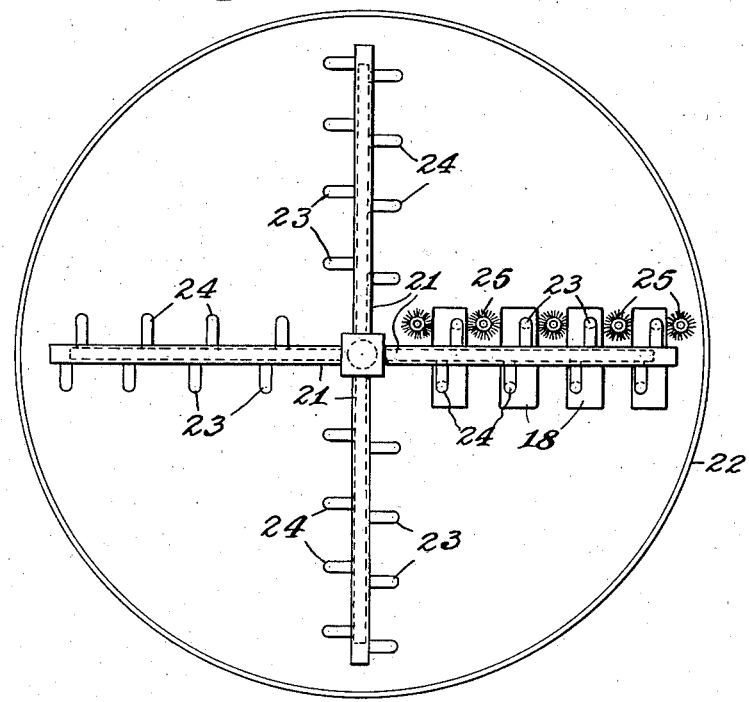
Fig. 4 is a diagrammatic view illustrating another arrangement for a batch process.

The process depends upon the principles of osmosis and comprises broadly placing the liquid to be concentrated on one side of a semi-permeable membrane, while on the other side of the membrane is placed a concentrated substance such as dry sugar, a concentrated sugar syrup, a solution of calcium chloride, or any suitable concentrated material that will set up osmotic action.

Any suitable material can be used for the semi-permeable membrane, such as parchment paper or cellophane. This latter material has been found to be particularly advantageous in the treatment of fruit juices, since it is less permeable to the flavoring constituents of the juices.

The process will be explained in detail as applied to the concentration of orange juice to form an intensified or concentrated juice.

Fresh orange juice is placed on one side of a membrane, preferably cellophane, and a syrup of approximately 80° Brix, containing 50% invert more or less, is placed on the other side of the membrane. Water passes from the juice into the syrup and the dilute syrup thus formed rises to the top and can be skimmed off, and reconcentrated in a vacuum still. From time to time this reconcentrated syrup can be added to the diluted syrup, thereby maintaining the Brix of the syrup at approximately 75° Brix. In this way the steady extraction of the water from the juice raises the Brix from the original concentration of about 13° Brix to any desired point, limited only by the fact that the Brix of the syrup must always be slightly higher than the Brix of the juice. If it is desired to carry the concentration of the juice to 75° Brix without the addition of sugar, it is necessary towards the end of the operation to remove all the diluted syrup and to replace it with syrup of 80° Brix or higher. Since, however, the presence of a small quantity of sugar in the concentrated orange juice is, for most purposes, entirely unobjectionable, I may carry on the operation until the Brix of the juice is about 68° and then raise it to 75° by melting in it the desired quantity of granulated sugar.

I have found that there is a tendency for the citric acid in the juice to pass through the membrane into the sugar syrup. In order to prevent this I add to the sugar syrup a sufficient quantity of citric acid so as to maintain the concentration of acid on each side of the membrane at approximately the same degree. It is obvious that an alternative to this would be to add a sufficient quantity of citric acid to the finished juice in order to restore its original acidity.

In the example quoted above I started with the fresh juice and suggested the possibility of adding sugar at the end of the operation in order to raise the Brix. An alternate procedure is to add more or less sugar to the juice before placing it in the dialyzer. This may be of some advantage, especially in cases where a larger percentage of sugar in the finished product is not objectionable. By adding sufficient sugar to the juice to raise the Brix to about 40°, the keeping qualities of the juice are improved during the concentrating process, and there is less danger of the flower deteriorating, especially when the process must be carried out in artificially heated rooms where the temperature reaches 70° or over.

The process can also be applied in the production of so-called glacé fruits. Such fruits are saturated with a sugar syrup before being coated with the crystalline sugar which gives them their characteristic appearance. The method most commonly used in bringing about the saturation is to boil the fruit in a series of syrups, each syrup having a higher concentration than the one before it. This method has the great disadvantage that the repeated boiling of the fruit almost completely destroys its flavor. By our method of dialysis the entire process of saturation could be carried out at room temperature and the original flavor of the fruit thus preserved. The fruit, either in its own juice, or in a thin syrup, is placed in the dialyzer and a heavy syrup is placed on the other side of the diaphragm. Water passes from the juice or thin syrup so that its concentration slowly rises. As this occurs, the concentration of syrup in the fruit also rises and this concentration can be carried to any desired point by means of raising the Brix of the syrup on the other side of the diaphragm. As in all other cases, the diluted syrup formed by the absorption of water can be reconcentrated by boiling under vacuum.

Such liquids as milk and coffee extract are concentrated by means exactly similar to those already described.

Using this process an extract of coffee was concentrated from 15% solids to 75% solids at room temperature without difficulty and with the production of a concentrate having an excellent flavor.

Starting with milk having approximately 13% solids, this process has been used to remove water until the solids have risen to approximately 70%, representing about a 7 to 1 concentration by volume. The milk concentrate thus formed has no cooked flavor and its color is unchanged, except that the natural color is intensified by the concentration.

The process can also be advantageously used for the concentration of syrups containing invert sugar. Due to the presence of levulose it is difficult to concentrate such syrups without slight caramelization occurring, with a consequent darkening of color. By the use of this process a water-white invert syrup can be produced.

In thus concentrating a sugar syrup it is possible to use as a concentrating medium melted raw sugar, which contains about 72% solids. This raw syrup must be diluted to about 50% solids before it is put through the refining process. If therefore the purified syrup having a Brix of about 50° is placed on one side of a membrane and the raw syrup is placed on the other side, water will pass from the light, purified syrup to the heavy, raw syrup. This serves the double purpose of concentrating the refined syrup and of diluting the incoming raw syrup.

It will be seen that the great advantage of this method of concentrating is that the concentration occurs at room temperature or at still lower temperatures. It is, for instance, possible to concentrate such thin juices as orange juice, or such readily spoilable liquids as milk, at temperatures encountered in cold storage. At such low temperatures the passage of water from liquid to syrup is somewhat slower, but it is none the less a practicable procedure. The removal of water from the system by evaporation under vacuum takes place entirely apart from the fruit juice or other liquid being concentrated. Thus, in the case of milk, the evaporation of the water takes place after it has been extracted from the milk, so that the cooked flavor which is commonly found in evaporated and condensed milk is entirely absent from the product prepared by our process.

In all the examples quoted above I have employed sugar or sugar syrup for the absorbing medium. It is, however, obvious that any concentrated solution can be used. For instance, I have in some experiments used calcium chloride on one side of the diaphragm in place of the sugar syrup. Under these conditions the passage of water through the diaphragm is very rapid. It has, however, the disadvantage that any slight leakage of calcium chloride in the opposite direction contaminates the product undergoing concentration. It is for this reason that I prefer to use sugar or sugar syrups, but I recognize that the use of other highly soluble solids is possible under certain circumstances. In practice it has been found that an activated vegetable carbon will absorb water through a semi-permeable membrane, and it is possible that other solid materials may operate in the same manner. For this reason it is to be understood that where the term substance or equivalent is used in the claims, this term is intended to cover solid as well as liquid soluble material.

The process can be carried out in equipment designed for either continuous or batch operation, as in the several embodiments illustrated herein.

Referring more particularly to Figs. 1 and 2, which illustrate a single cell for a continuous concentration process, the confronting faces of the plates 10 and 11 are formed with similar sinuous grooves 12 which are so arranged as to register with each other when the plates are assembled as in Figs. 1. A semi-permeable diaphragm of any preferred material is clamped between the plates as shown at 13 in Fig. 1. The material to be concentrated, for example, fresh fruit juice, flows in at the inlet 14 at the upper side of plate 10 and after being concentrated by passing through channel 12 in contact with the semi-permeable diaphragm, it emerges from outlet 15 at the bottom of plate 10 in a more concentrated condition.

The syrup solution flows in the opposite direction through plate 11 entering as a heavy syrup by inlet 16 and coming out as a more diluted syrup by outlet 17.

The plates 10 and 11 may be supported on a filter press framework and pressed together in the usual manner. Any convenient number of plates can be used.

The apparatus illustrated in Fig. 3 is designed for a batch operation and includes a number of frames 18 covered with membrane material 19. Each frame forms a container, and a number of these containers are placed side by side in tank 20. The heavy syrup can be placed within the containers 18 and the fruit juice may be permitted to circulate through the tank or the juice may be placed in the container and the heavy syrup be allowed to circulate around them in the tank. In either case the diluted syrup which rises to the top can be drawn off, either continuously or periodically and reconcentrated by boiling under vacuum after which it is reintroduced into the system.

Figure 5:
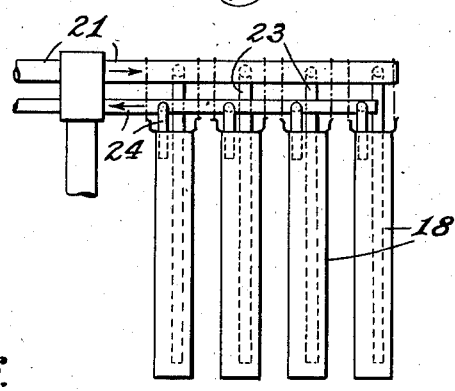
Fig. 5 is a diagrammatic view illustrating a detail of Fig. 4.

In the treatment of some materials which contain a large amount of suspended matter, such as milk, where there is a constant tendency for the batch to separate, it is advantageous to use some form of agitation, so that the liquid undergoing concentration is kept continually moving over the face of the diaphragm. Such action can be conveniently carried out in the apparatus illustrated diagrammatically in Fig. 4, in which the frames 18 are carried by arms 21 which radiate from a revolving shaft. The milk is placed in the tank 22 and the concentrated material such as the heavy syrup is placed in the containers 18. The heavy syrup can be changed continuously by providing the radial arms 21 with a heavy syrup inlet 23 and a light syrup outlet 24 as shown in Fig. 5. Stationary brushes or scrapers 25 may be provided to wipe the surfaces of the diaphragm.

Figure 6:
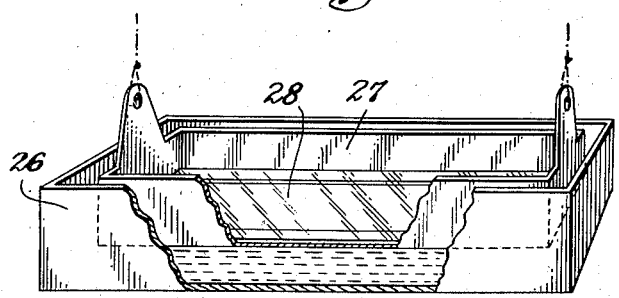
Fig. 6 illustrates another apparatus for carrying out a batch process.

Another form of batch equipment is illustrated in Fig. 6 where the inner tray 27 is provided with a diaphragm bottom 28. This inner tray contains the heavy syrup, and the outer tray 26 contains the fruit juice. As the volume of fruit juice shrinks, the upper tray is lowered to keep the diaphragm in contact with the juice. This method lends itself particularly for preparing whole or sliced fruits.

I claim:

1. The process of concentrating juices of citric acid fruits which comprises, placing the fresh fruit juice in contact with one side of a semipermeable membrane, and placing in contact with the other side of the membrane sugar in a high concentration to which has been added an amount of citric acid sufficient to bring the concentration of acid on each side of the membrane to approximately the same degree, whereby water passes from the fruit juice to the opposite side of the membrane by osmotic action and the concentration of the fruit juice is raised.

2. The process of concentrating juices of citric acid fruits which comprises, expressing the juice from the fruit, placing the freshly expressed juice in contact with one side of a cellophane diaphragm and placing in contact with the other side of the diaphragm a concentrated sugar solution to which has been added an amount of citric acid sufficient to bring the concentration of acid on each side of the membrane to approximately the same degree, whereby water passes from the fruit juice to the opposite side of the membrane by osmotic action and the concentration of the fruit juice is raised.

LEONARD WICKENDEN.